UNITED STATES PATENT OFFICE 2,430,791

3-METHYLOL-2(3)-BENZOTHIAZOLINE-THIONE AS A FUNGICIDE

William P. ter Horst, Pompton Plains, N. J., assignor to United States Rubber Company, New York, N. Y., a corporation of New Jersey No Drawing. Application April 5, 1945,
Serial No. 586,829

10 Claims. (Cl. 167—33)

This invention relates to new and useful improvements in parasiticidal preparations, more particularly to germicides, that is, fungicides and bactericides. The invention further relates to methods of treating plants, and to methods of protecting organic material subject to attack by microorganisms, as the immunizing of seed, and the mildewproofing of fabrics and other material.

I have found that 3-methylol-2(3)-benzothiazolinethione is an effective fungicide and bactericide. The structure of 3-methylol-2(3)-benzothiazolinethione may be represented as follows:

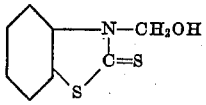

The chemical may be prepared in a known manner by the reaction of formaldehyde with mercaptobenzothiazole. The chemical has been disclosed as a rubber vulcanization accelerator. The 3-methylol-2(3)-benzothiazolinethione may be used as a seed protectant and to protect plants, which term includes plant parts, or soil from microorganisms harmful to seeds and plants. It may also be applied to prevent or retard fungus growth and the formation of, for example, mildew or organic material, such as rope, wood, fur, hair, feathers, cotton, wool, leather, paints, varnishes, and the like. The 3-methylol-2(3)-benzothiazolinethione may be applied as a dust, undiluted or mixed with a powdered inert solid carrier, such as clay or talc, or as a spray in a liquid carrier, as in solution in a suitable solvent, or suspended in a suitable non-solvent medium, for example, water. It may be used admixed with carriers that are active of themselves, for example, other fungicides or bactericides, or insecticides, insect repellents, fertilizers, hormones, buffering or safening agents.

The following examples are given to illustrate the invention (all percentages and parts being by weight):

Example I

Pea seed, variety Perfection, were tumbled with 1.5% of 3-methylol-2(3)-benzothiazolinethione in dust form. The seeds were then planted in soil known to be infested with a number of organisms, including *Pythium ultimum*. The effectiveness of the chemical as a fungicide was determined by comparing the number of treated and untreated seeds which germinated into healthy plants from equal numbers of treated and untreated seeds planted under the same conditions. Observations made at the end of ten days showed that 86% of the treated seeds had germinated and grown into healthy seedlings, whereas only 9% of the untreated seeds germinated and grew.

Example II

This case illustrates the effectiveness of 3-methylol-2(3)-benzothiazolinethione as a bactericide. A medium to support bacterial growth was prepared by dissolving 1% of glue in water, together with .2% of $NaH_2PO_4$ and .2% Nacconol NR (a commercial dispersing agent, dodecyl benzene sodium sulfonate). This medium when exposed to air, thus becoming contaminated with naturally occurring bacteria, and then allowed to stand, became overgrown with bacterial growth in 30 days. On the other hand, when 1% of 3-methylol-2(3)-benzothiazolinethione was mixed with the glue medium, it would not support such bacterial growth.

Example III

Naturally highly infested fuzzy "Stoneville 62B" cotton seed was treated with 3-methylol-2(3)-benzothiazolinethione by tumbling, at the rate of 3 oz. of 3-methylol-2(3)-benzothiazolinethione per bushel of seed. Equal numbers of seeds treated with 3-methylol-2(3)-benzothiazolinethione and of untreated seed were planted in greenhouse soil. The emergence for the untreated seed was 88% and for the treated seed, 91%. Of the seedlings from the treated seed 68% grew into healthy plants, whereas only 35% of the seedlings from untreated seed grew into healthy plants.

Example IV

This case illustrates the mildew proofing properties of 3-methylol-2(3)-benzothiazolinethione. A piece of cotton fabric was immersed in a 1% solution of 3-methylol-2(3) - benzothiazolinethione in acetone until thoroughly impregnated with the solution, after which the fabric was air dried. A second piece of the fabric was treated with acetone only and dried. Both pieces were then inoculated with a spore suspension of *Chaetomium globosum* and incubated for thirty days. At the end of the incubation period it was observed that the material treated with 3-methylol 2(3)-benzothiazolinethione was free of fungus growth, whereas the untreated piece was heavily overgrown with fungus. Bursting strength tests on the fabrics before and after the inoculation and incubation treatment showed that the sample treated with 3-methylol-2(3)-benzothiazolinethione retained 80% of its bursting strength, whereas the fabric which was not treated with 3-methylol-2(3)-benzothiazolinethione retained only 15% of its bursting strength.

*Example V*

This case illustrates the effectiveness of 3-methylol-2(3)-benzothiazolinethione as a foliage fungicide. Tomato plants (4" to 6" tall) were sprayed with aqueous suspension containing 2000, 400 and 80 parts per million respectively of 3-methylol-2(3)-benzothiazolinethione. The aqueous suspensions of 3-methylol-2(3)-benzothiazolinethione contained 1 part of Vatsol OS (a commercial dispersing agent, dioctyl sulfosuccinate), per 100 parts of the 3-methylol-2(3)-benzothiazolinethione. The sprayed deposits were allowed to dry on the foliage. The plants together with untreated check plants were uniformly inoculated by spraying a suspension of spores of *Alternaria solani* onto the foliage and then were placed in an atmosphere of 100% humidity for twenty hours. Forty hours later the effectiveness of the chemicals was determined by counting the blight lesions on the tomato plants. The untreated plants had an average of 173 lesions per plant. The effectiveness of the 3-methylol-2(3)-benzothiazolinethione at the two concentrations was measured by the blight control exhibited by the treated plants as expressed by percent control based on the untreated check plants. The 3-methylol-2(3)-benzothiazolinethione showed 100% control (no lesions) at a concentration of 2000 parts per million, 97% control at a concentration of 400 parts per million, and 89% control at a concentration of 80 parts per million.

*Example VI*

Barley seeds known to be infected with the destructive root rotting fungus *Helminthosporium sativum*, were treated with 1% of 3-methylol-2(3)-benzothiazolinethione in powdered form. Laboratory and soil tests for the disinfecting property of the chemical were made as follows: In the laboratory test 25 of the thus treated seeds were placed on a pad of filter paper in a petri dish which contained 2 cc. of a 2% dextrose solution. Observations were made after six days. Infection of the seeds that were not successfully disinfected could readily be detected by the presence of dark colored *Helminthosporium sativum* sporulating on the surface of the seeds and in a narrow zone on the filter paper about the seeds. The treated seeds were scored as to percent control based upon the number of infected seeds in the untreated seeds. In the soil tests, seeds similarly treated as above by tumbling with 1% of 3-methylol - 2(3) - benzothiazolinethione were planted in greenhouse soil and held at a temperature of 60° F. which is optimum for the development of the disease. Three weeks later the plants were removed from the soil, washed free from adhering debris, and scored as to whether or not they were free from disease. In the laboratory tests 3-methylol-2(3)-benzothiazolinethione showed 80% control, that is, only 20% of the seeds treated with the chemical showed infection, whereas seeds not treated with the chemical and similarly placed on filter paper wet with dextrose solution, showed 100% infection. In these laboratory tests, 90% of the treated seeds and 90% of the untreated seeds germinated. In the soil tests, the plants from seeds treated with the chemical showed only 12% infection, whereas plants from seeds not treated with the chemical showed 84% infection. In these soil tests, 85% of the treated seeds and 77% of the untreated seeds germinated.

Having thus described my invention, what I claim and desire to protect by Letters Patent is:

1. A germicidal preparation comprising 3-methylol-2(3)-benzothiazolinethione and a carrier therefor selected from the group consisting of powdered solid carriers and water containing a dispersing agent.

2. A fungicidal preparation comprising an aqueous suspension of 3-methylol-2(3)-benzothiazolinethione, said aqueous suspension containing a dispersing agent.

3. The method which comprises treating plants with 3-methylol-2(3)-benzothiazolinethione.

4. The method of protecting organic material subject to attack by microorganisms which comprises applying to said organic material an aqueous suspension of 3-methylol-2(3)-benzothiazolinethione containing a dispersing agent.

5. The method of controlling fungi on plants which comprises treating plants with 3-methylol-2(3)-benzothiazolinethione.

6. The method of protecting seeds, plants, and soil subject to attack by fungi which comprises treating said material with 3-methylol-2(3)-benozothiazolinethione.

7. The method of immunizing seed which comprises treating said seed with 3-methylol-2(3)-benzothiazolinethione.

8. The method of controlling fungi on living organisms which comprises treating said organisms with 3-methylol-2(3)-benzothiazolinethione.

9. The method of destroying fungi which comprises subjecting said fungi to the action of a liquid containing 3-methylol-2(3)-benzothiazolinethione.

10. The method which comprises treating loci subject to attack by fungi with an aqueous suspension of 3-methylol-2(3)-benzothiazolinethione containing a dispersing agent.

WILLIAM P. TER HORST.

REFERENCES CITED

The following references are of record in the file of this patent:

UNITED STATES PATENTS

| Number | Name | Date |
| --- | --- | --- |
| 1,960,197 | Zimmerman | May 22, 1934 |
| 1,961,840 | Bolton | June 5, 1934 |
| 2,358,402 | Kurlychek | Sept. 19, 1944 |